United States Patent [19]

Ko

[11] Patent Number: 5,449,876
[45] Date of Patent: Sep. 12, 1995

[54] MULTI-POINT SPOT WELDING MACHINE CONTROLLER

[76] Inventor: Meng-Chang Ko, No. 34, Alley 2, Lane 313, Han Sheng E. Rd., Pan Chiao City, Taipei Hsien, Taiwan

[21] Appl. No.: 226,697

[22] Filed: Apr. 12, 1994

[51] Int. Cl.⁶ ............................................. B23K 11/24
[52] U.S. Cl. ..................................................... 219/108
[58] Field of Search ................................. 219/108, 110

[56] References Cited

U.S. PATENT DOCUMENTS

| | | | |
|---|---|---|---|
| 4,063,075 | 12/1977 | Collom | 219/108 |
| 4,985,612 | 1/1991 | Izume et al. | 219/110 |
| 5,072,090 | 12/1991 | Morita | 219/108 |
| 5,166,491 | 11/1992 | Izume et al. | 219/110 |
| 5,171,960 | 12/1992 | Takano et al. | 219/108 |

*Primary Examiner*—Clifford C. Shaw
*Attorney, Agent, or Firm*—W. Wayne Liauh

[57] ABSTRACT

A multi-point spot welding controller includes a central processing unit, a memory means, a monitoring interface device, a system bus, an input device, a first display device, a second display device, an output interface device, a switch output interface device, a plurality of spot welding circuits, and a plurality of pairs of welding electrodes. The central processing unit together with the memory device constitutes a central control device for controlling operation of the spot welding controller. The monitoring interface device is electrically connected to the central processing unit and allowed to be electrically connected to an external personal computer by which a user can operate to monitor and control the spot welding machine. The switch output interface device is electrically connected to the system bus for controlling the welding electrodes to move up or down, to respectively start or stop welding. The output interface device is electrically connected to the system bus for sending a plurality of welding signals. The spot welding circuit is electrically connected to the output interface device for receiving the welding signals therefrom and responsive to drive or stop driving a pair of welding electrodes connected thereto.

2 Claims, 9 Drawing Sheets

MULTI-POINT SPOT WELDING MACHINE CONTROLLER

BACKGROUND OF THE INVENTION

1. Field of the Invention

The present invention relates to a multi-point spot welding machine controller.

2. Description of the Prior Art

Spot welding machines are commonly used in mechanical manufacturing industry. Normally, two workpieces, such as two zinc-plated steel sheets, are connected by a spot welding procedure comprising the following steps: firstly, clamping the two workpieces by two electrodes; secondly, applying electrical power through the two electrodes resulting in a low voltage and high current to pass through two welding points of the two workpieces; thirdly, stopping applying electrical power to the electrodes yet retaining the two electrodes to clamp the two workpieces for a specific time period; fourthly, releasing the two electrodes from the two workpieces. For multi-point spot welding, a working person has to repeat the above procedure from one welding point to another welding point thus wasting time. Several multi-point spot welding machines are commercially available, yet while these machines provide synchronous welding to a number of welding points at the same time, they also consume a great deal of electricity in a short time period. These machines can not operate properly in a working site where the electricity supply is not great enough. Moreover, the great amount of electricity applied on the workpiece will cause high temperature thereon and damage the outer surface of the zinc-plated steel sheet thus resulting in zinc molecules forming a zinc film to cover the electrodes. In this situation the conductivity of the electrodes is decreased and lowers the welding effect of the welding machine. It is requisite to provide a multi-point spot welding controller to synchronously/asynchronously control a multi-point spot welding machine to connect two workpieces without resulting in the above problems.

SUMMARY OF THE INVENTION

The primary objective of the present invention is to provide a multi-point spot welding controller.

In accordance with one aspect of the invention, there is provided a multi-point spot welding controller comprising a central processing unit, a memory means, a monitoring interface means, a system bus, an input means, a first display means, a second display means, an output interface means, a switch output interface means, a plurality of spot welding circuits, and a plurality of pairs of welding electrodes. The central processing unit together with the memory means constitutes a central control means for controlling operation of the spot welding controller. The monitoring interface means is electrically connected to the central processing unit and allowed to be electrically connected to an external personal computer by which a user can operate to monitor and control the spot welding machine. The switch output interface means is electrically connected to the system bus for controlling the welding electrodes to move up or down, to respectively start or stop welding. The output interface means is electrically connected to the system bus for sending a plurality of welding signals. The spot welding circuit is electrically connected to the output interface means for receiving the welding signals therefrom and responsive to drive or stop driving a pair of welding electrodes connected thereto.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
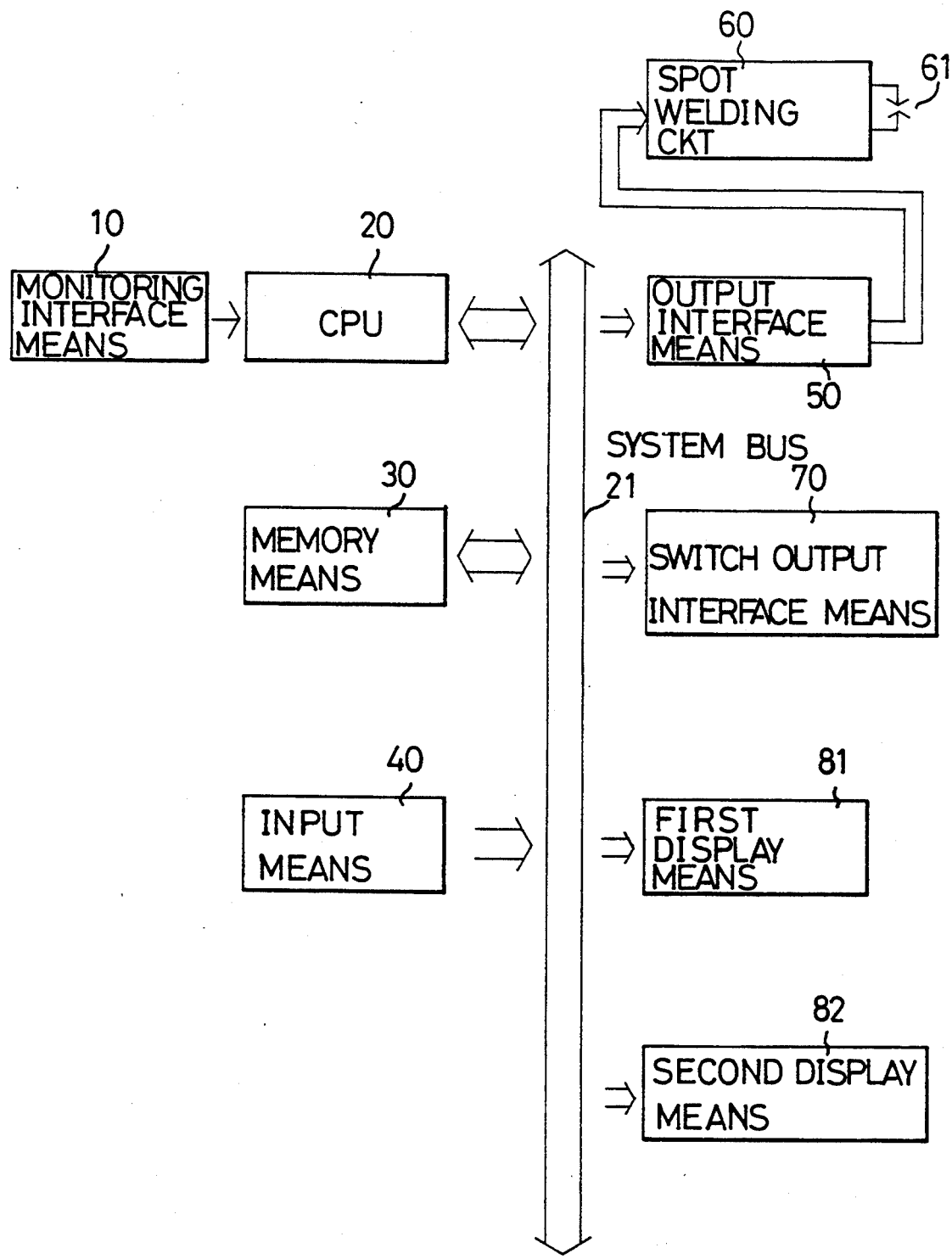
FIG. 1 is a block diagram of a multi-point spot welding controller in accordance with the present invention.
Figure 2:
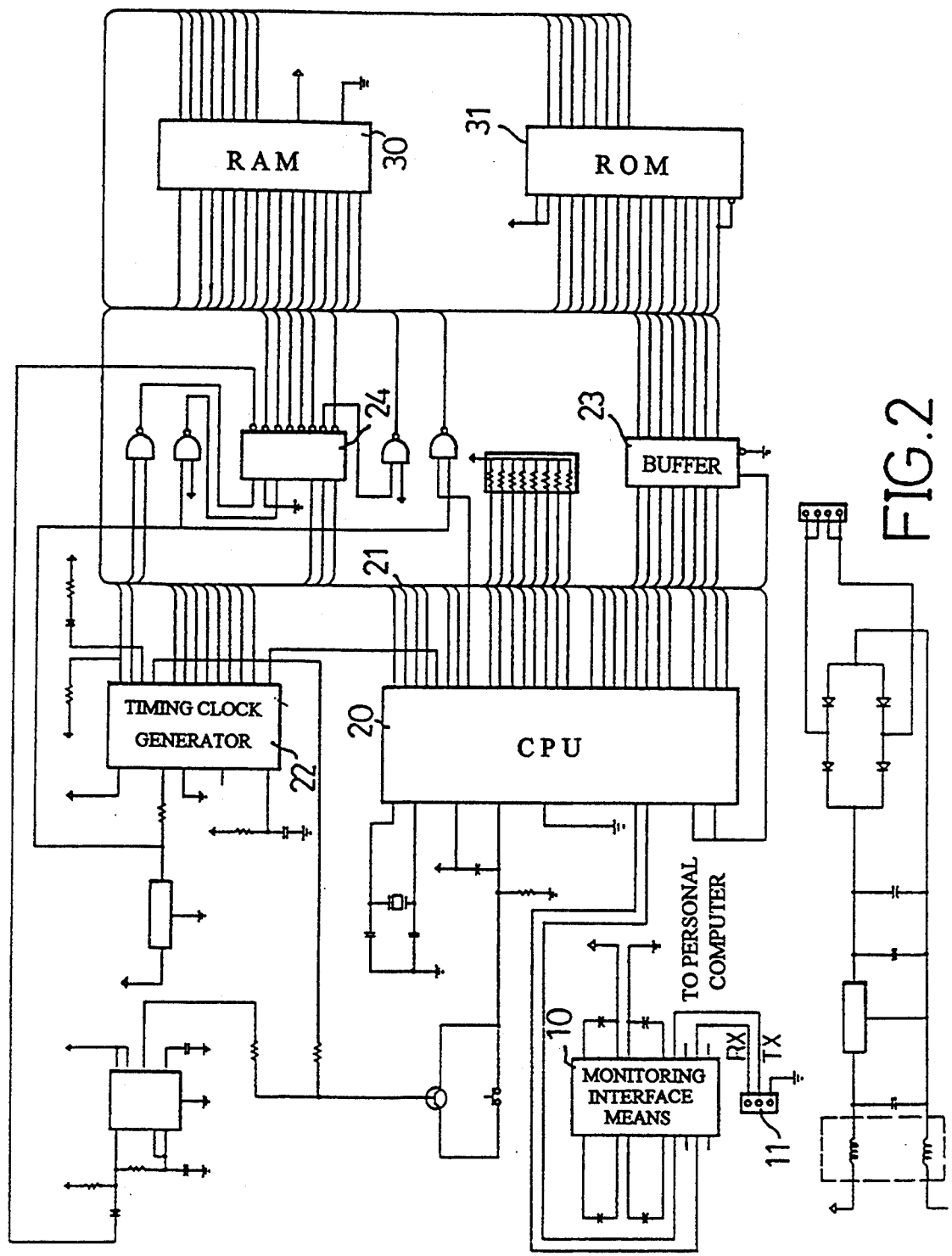
FIG. 2 is a partial circuit diagram, including a central processing unit, a memory, and a monitoring interface, of the controller in FIG. 1.

Referring to FIG. 1, a multi-point spot welding controller in accordance with the present invention comprises a central processing unit (CPU) 20, a memory means 30, a monitoring interface means 10, a system bus 21, an input means 40, a first display means 81, a second display means 82, an output interface means 50, a switch output interface means 70, a plurality of spot welding circuits 60, and a plurality of pairs of welding electrodes 61. The central processing unit 20 together with the memory means 30 constitute a central control means for controlling operation of the spot welding controller. The memory means 30 comprises a random access memory (RAM) for storing data inputted by a user or data computed by the CPU 20, and a read only memory (ROM) 31 for storing a software used to control the operation of the spot welding controller. The monitoring interface means 10 is electrically connected to the CPU 20 and is allowed to be electrically connected to a personal computer, thus a user may monitor and-control the spot welding machine at the personal computer. The system bus 21 is electrically connected between the CPU 20 and the memory means 30 as a bridge for data communication therebetween. The input means 40 is also electrically connected to the system bus 21 for inputting some spot welding parameters. The switch output interface means 70 is electrically connected to the system bus 21 for controlling the welding electrodes 61 to move up/down, to start/stop welding. The output interface means 50 is electrically connected to the system bus 21 for sending a plurality of welding signals. The spot welding circuit 60 is electrically connected to the output interface means 50 for receiving signals therefrom and is responsive to drive or stop driving a pair of welding electrodes 61 connected thereto. The first display means 81 and the second display means 82 are also electrically connected to the system bus 21 for displaying operational parameters such as the welding condition, 19 the switch ON/OFF status, the operation of the spot welding machine, the compression time period, the preheat time period, the standby time period, the welding time period, and the heat compensation time period, where the first display means 81 is an LCD allowed to show the information in readable wording thus a normal person can read the information, while the second display means 82 comprises a plurality of seven-segment LEDs and is allowed to show the information in a much simpler way thus only some operating technicians can read the information.

FIGS. 2 to 8 illustrate a circuit diagram of the above components. First referring to FIG. 2, the CPU 20, the memory means 30, the system bus 21, and the monitoring interface means 10 are illustrated. A timing clock generator 22 for generating required timing clocks is electrically connected to the system bus 21. A buffer 23 and an address decoder 24 are electrically connected to the system bus 21 and function in a well known manner, thus are not described in detail. The memory means 30 as shown in the right side of the figure includes a RAM 30 and a ROM 31. The monitoring interface means 10 is a serially controlled interface circuit which has a first line TX for outputting data therefrom and a second line RX for inputting external data thereto. A connector 11 is connected to the first line TX and the second line RX is allowed to link the monitoring interface means 10 with a personal computer.

Figure 3:
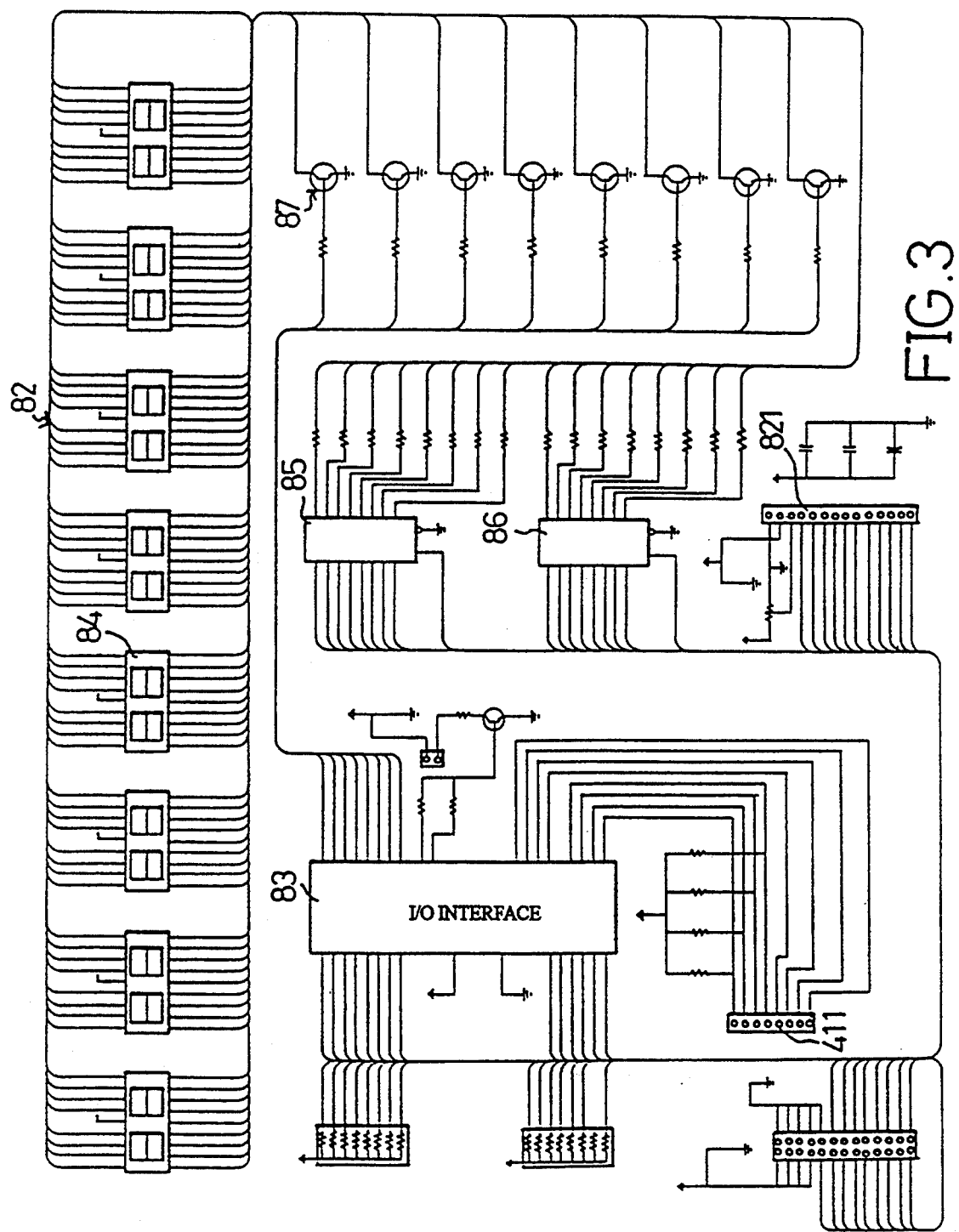
FIG. 3 is a display interface circuit of the controller in FIG. 1.

Referring to FIG. 3, an I/O interface 83 is electrically connected between the keyboard 40 and the CPU 20. Actually the keyboard 40 is connected to an input port of the I/O interface 83 via a connector 411. The I/O interface 83 is also electrically connected between the CPU 20 and the LCD 81 via a connector 821. Actually the I/O interface 83 has an output port connected to the connector 821 which is further connected to the LCD 81. Similarly the I/O interface 83 has another output port connected to the LED display assembly 82 via a plurality of driving transistors 87. Actually the LED display assembly 82 comprises a plurality pairs of seven-segment LEDs 84. Each pair of the seven-segment LEDs 84 is driven by a corresponding one of the transistors 87.

Figure 4:
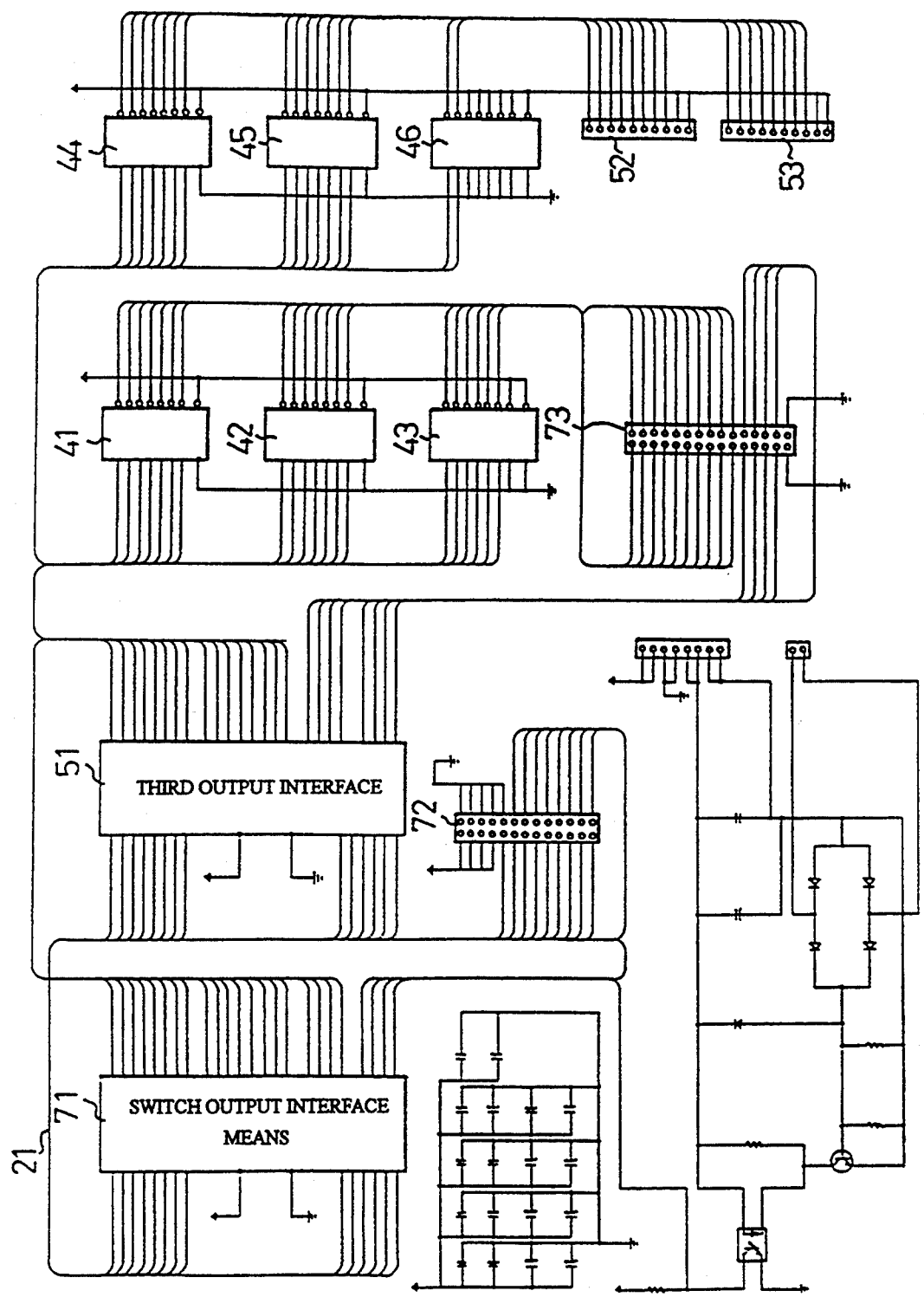
FIG. 4 is an input/output interface circuit of the controller in FIG. 1.

FIG. 4 is an output interface circuit for controlling the output interface means 50 and the switch output interface means 70. A second output interface 71 is electrically connected to the system bus 21 for sending a triggering signal to actuate the switch output interface circuit 70. A third output interface 51 sends a triggering signal to actuate the output interface means 50. The second output interface 71 has I/O ports thereof connected to the first output interface 83 (see FIG. 3) via a connector 72. The output interface means 50 and the switch output interface means 70 are connected to a solenoid interface connector 73 and two welding output connectors 52, 53 via a plurality of buffers 40, 41, 42, 43, 44, and 45. The two welding output connectors 52, 53 each has eight welding signal terminals which are electrically connected to the spot welding circuit 60 as will be described in detail later.

Figure 5:
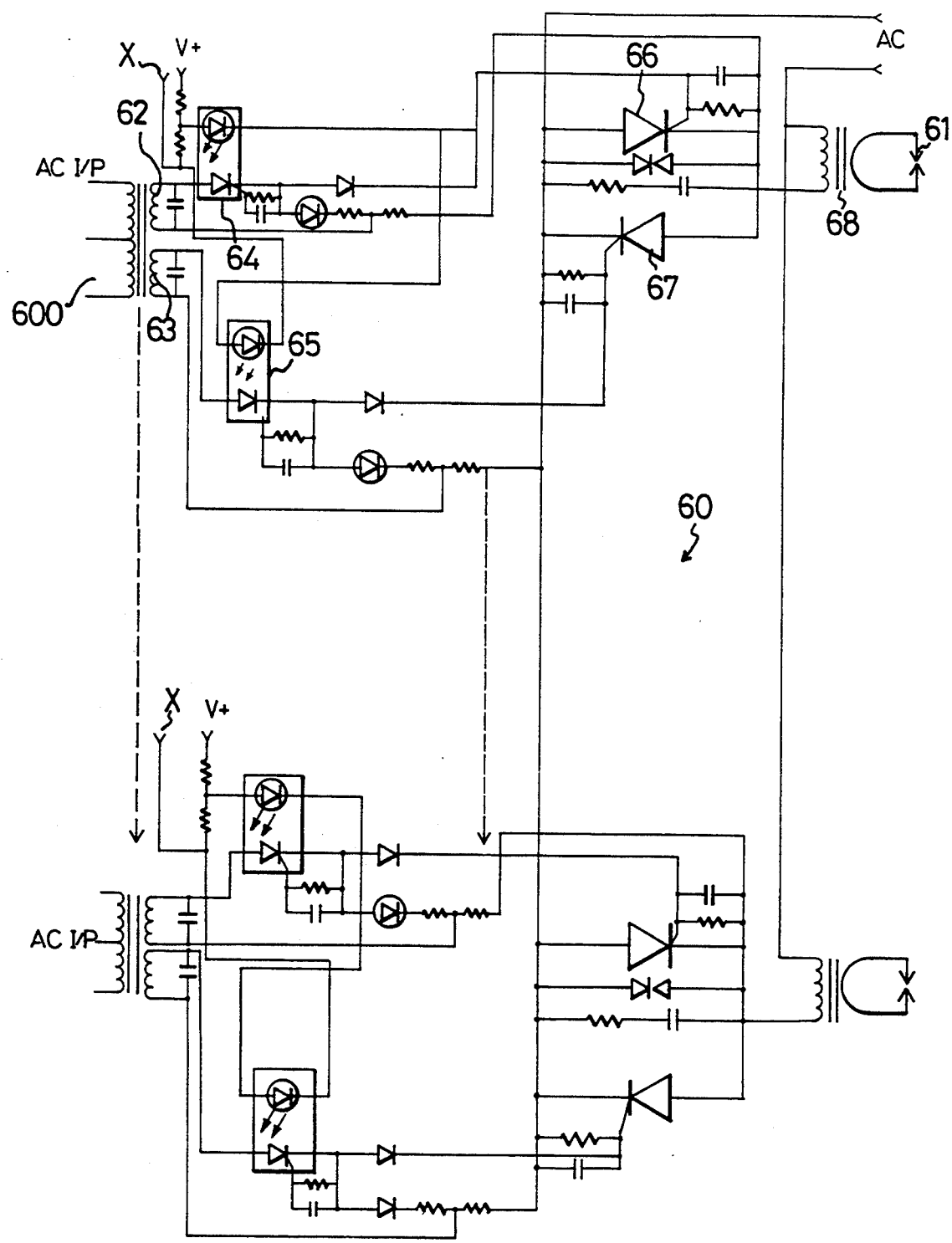
FIG. 5 is a spot welding circuit of the controller in FIGS. 1.
Figure 6:
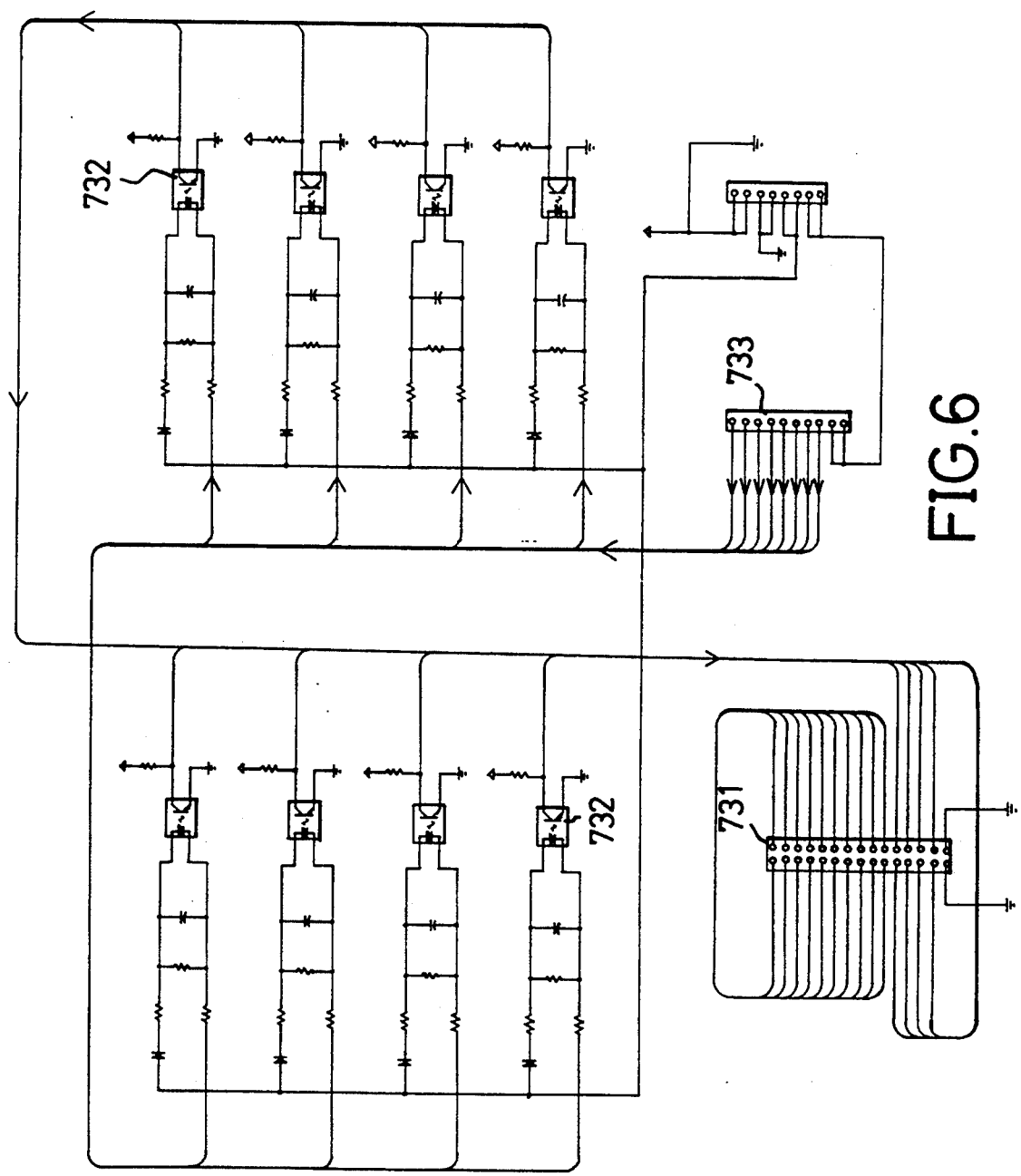
FIG. 6 is an input/output interface circuit of the controller in FIG. 1.

Referring to FIG. 5, the spot welding circuit 60 as shown in FIG. 1 is now illustrated in more detail. The spot welding circuit 60 comprises a plurality of subcircuits and herein merely two of them are shown, one being illustrated at upper portion of the figure and the other at lower portion thereof. Each Spot welding subcircuit comprises a first transformer 600 for converting an AC input voltage to a first signal 62 and a second signal 63 respectively at two secondary windings thereof. The first signal 62 and the second signal 63 are respectively coupled to a first photo-coupler 64 and a second photo-coupler 65. A control input terminal X is allowed to receive a logical signal to control the ON/OFF of the photo-couplers 64, 65. For example, the first photo-coupler 64 is in ON status when the control signal on the input terminal X is in logical high status and is in OFF status when the control signal on the input terminal X is in logical low status. Since the control signal on the X terminal is either in logical high status or in logical low status, the second photo-coupler 65 has a contrary status of that of the first photo-coupler 64. A first SCR switch 66 is electrically connected to the first photo-coupler 64 and is triggered ON when the latter is in ON status, otherwise is turned OFF. A second SCR switch 67 is electrically connected to the second photo-coupler 65 and is triggered ON when the latter is in ON status, otherwise is turned OFF. A second transformer 68 is electrically connected between the first SCR switch 66 and the second SCR switch 67 for receiving an AC power from one of the two SCR switches and converting the AC power to a required power for welding at a secondary winding thereof. A pair of welding electrodes 61 are connected to the secondary winding of the second transformer 68 for executing spot welding to workpieces therebetween. The first photo-coupler 64, the second photo-coupler 65, the first SCR switch 66, and the second SCR switch 67 together provide a relatively good isolation effect between the control signal on the X terminal and the second transformer 68.

Figure 7:
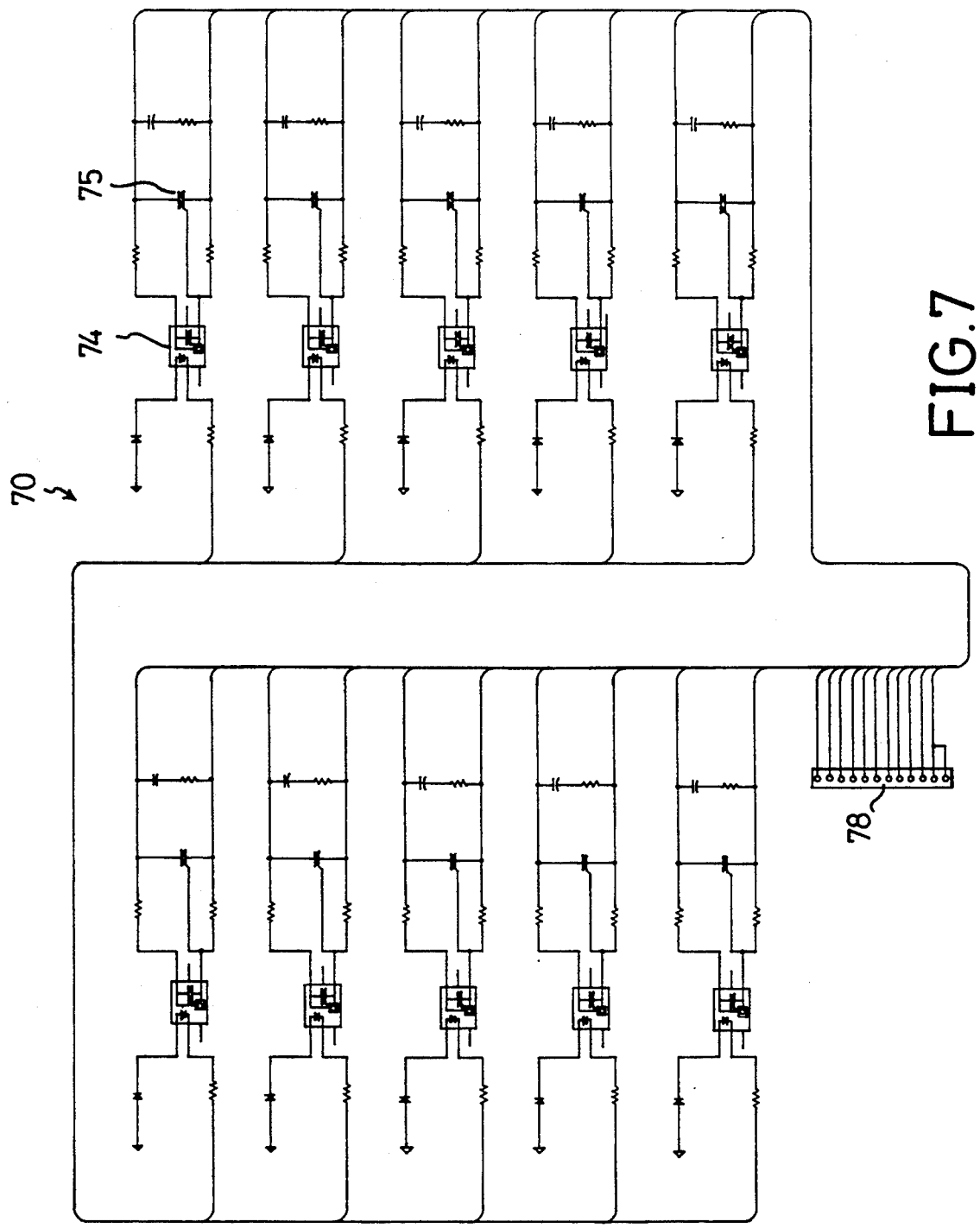
FIGS. 7 and 8 together form a solenoid output interface circuit of the controller in FIG. 1.
Figure 8:
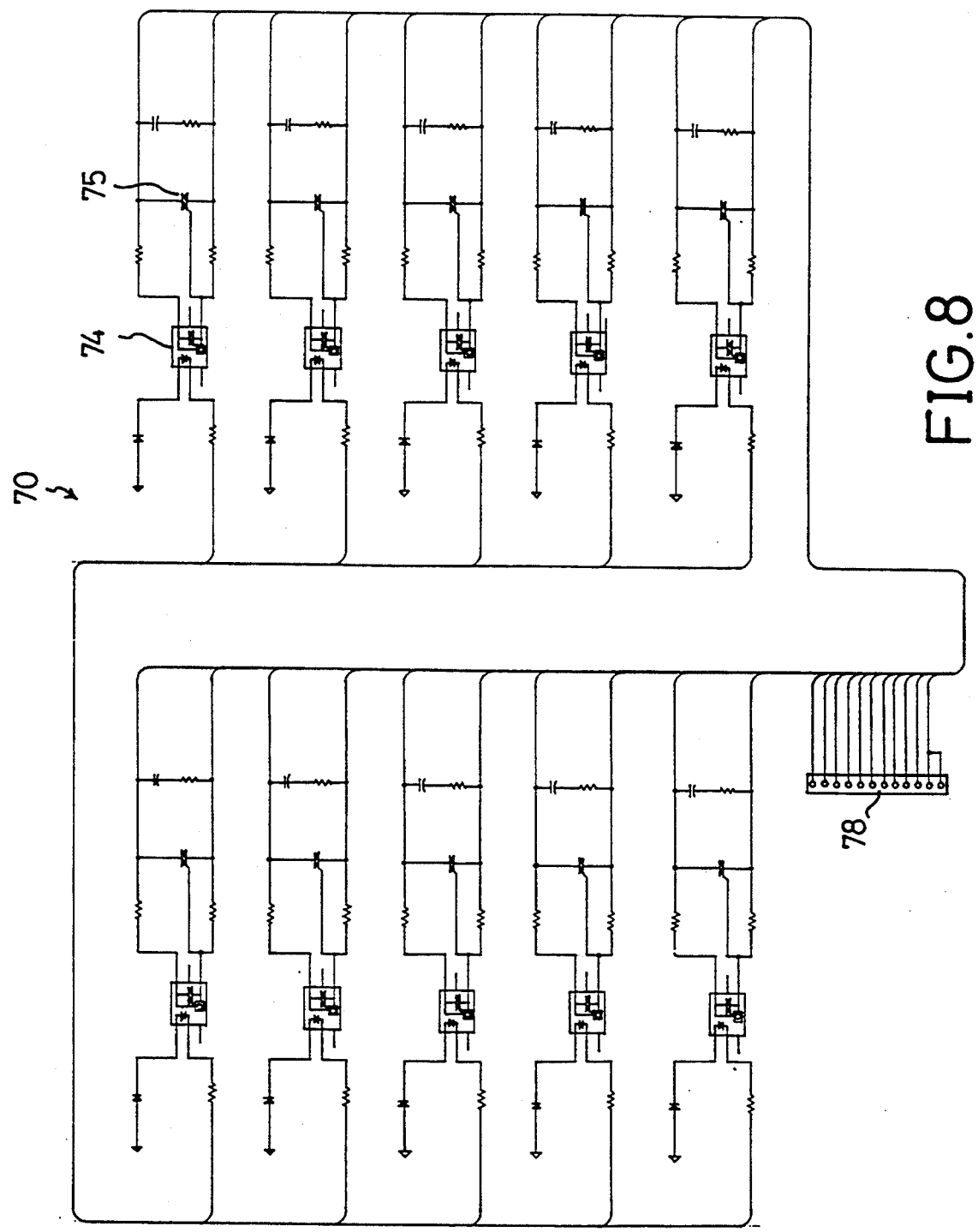

Referring to FIGS. 4, 7, and 8, the solenoid interface connector 73 of FIG. 4 has a plurality of pins electrically connected to the buffers 40, 41, and 42 and further connected to a plurality of photo-couplers 74 and TRIACs 75 of FIGS. 7 and 8. The solenoid interface connector 73 has another plurality of pins connected to a connector 731 of FIG. 6 and are further connected to a plurality of photocouplers 732 each of which is connected to a corresponding sensing pin from a connector 733. Each sensing pin of the connector 733 responds to provide a driving signal for moving a corresponding pair of electrodes 61 (see FIG. 5).

Figure 9:
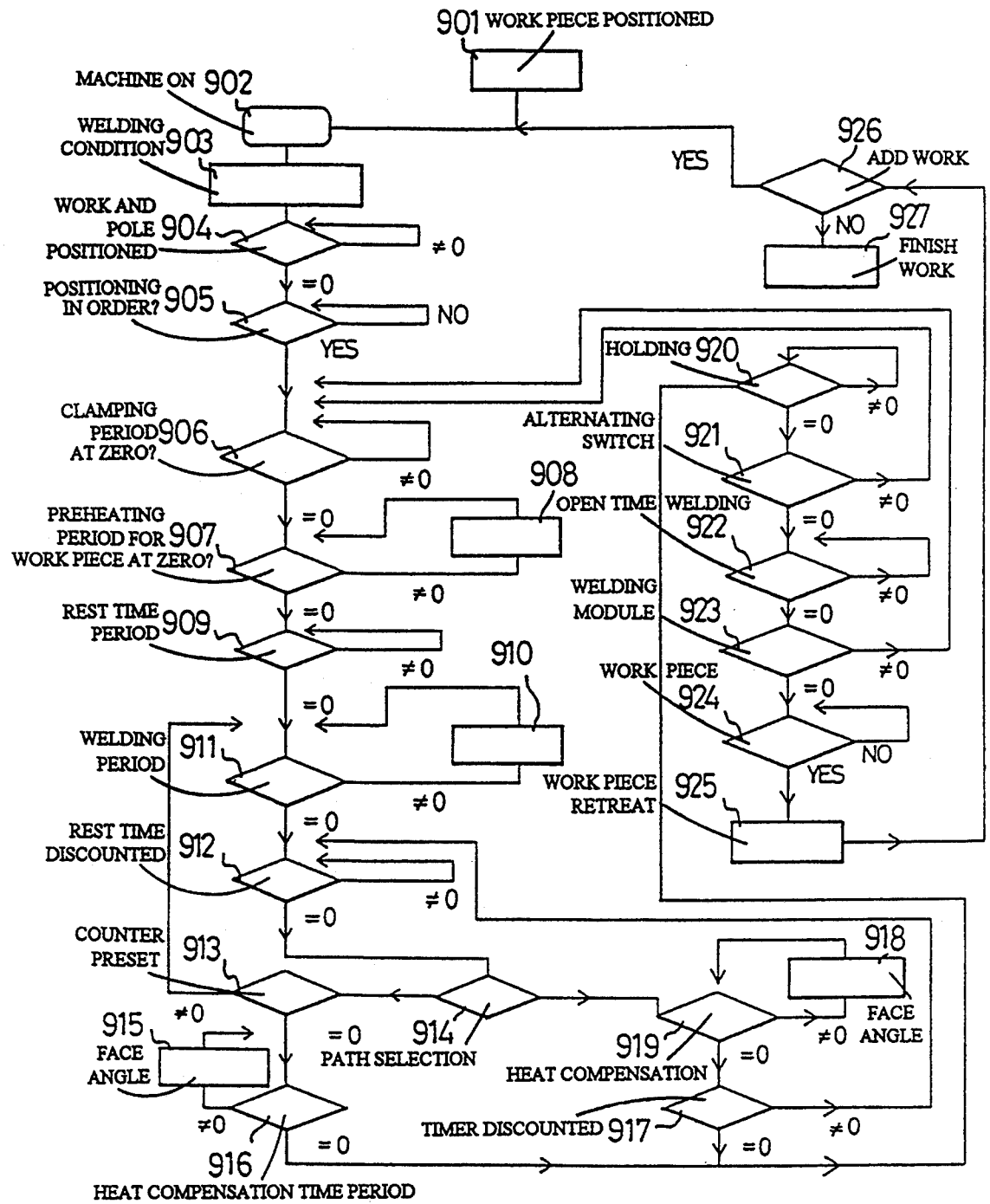
FIG. 9 is an operational flow chart of the controller of the present invention.

Referring to FIG. 9, a flowchart for spot welding is illustrated. Basically the function of the flowchart is determined by the preprogrammed CPU 20. In step 901, workpieces are positioned at a welding platform. In step 902, the welding machine is activated. In step 903, the welding condition is inputted. In step 904, the preprogrammed CPU 20 checks whether the workpieces and the poles of the welding machine are positioned in proper relative position by a down counter therein. If the predetermined time period is downcounted to zero, the procedure is forwarded to step 905, otherwise the step 904 is repeated. In step 905, the preprogrammed CPU 20 confirms whether the previous positioning step is in order. If the positioning is not in order, the step 905 is repeated, otherwise the procedure is forwarded to step 906. In step 906, the preprogrammed CPU checks whether the clamping time period on the workpieces has been downcounted to zero. If the clamping time period has not been downcounted to zero, the step 906 is repeated, otherwise the procedure is forwarded to step 907. In step 907, the preprogrammed CPU 20 checks whether the preheating time period on the workpieces has been downcounted to zero. If the preheating time period has not been downcounted to zero, the step 907 is repeated, in the meantime the phase angles of the SCRs 66 and 67 are not equal to zero allowing AC power to be transmitted to the pair of welding electrodes 61 via the second transformer 68, otherwise the procedure is forwarded to step 909.

In step 909, the preprogrammed CPU 20 checks whether a predetermined rest time period on the workpieces has been downcounted to zero. If the rest time period has not been downcounted to zero, the step 909 is repeated, otherwise the procedure is forwarded to step 911.

In step 911, the preprogrammed CPU 20 checks whether the welding time period on the workpieces has been downcounted to zero. If the preheating time period has not been downcounted to zero, the step 911 is repeated, in the meanwhile the phase angles of the SCRs 66 and 67 are not equal to zero allowing AC power to be transmitted to the pair of welding poles 61 via the second transformer 68, otherwise the procedure is forwarded to step 912.

In step 912, the preprogrammed CPU 20 checks whether a predetermined rest time period on the workpieces has been downcounted to zero. If the rest time period has not been downcounted to zero, the step 912 is repeated, otherwise the procedure is forwarded to step 914. Step 914 is a path selection for forwarding the procedure to either step 913 or step 919. The selection in step 914 is manually selected by an operator prior to the starting step 902 of the operation. In step 913, a preset counter in the preprogrammed CPU 20 is checked whether it has been downcounted to zero. If the counter is downcounted to zero, the procedure is forwarded to step 916, otherwise to step 911.

In step 916, the preprogrammed CPU 20 check whether a heat compensation time period on the workpieces has been downcounted to zero. If the heat compensation time period has not been downcounted to zero, the step 916 is repeated, in the meantime the phase angles of the SCRs 66 and 67 are not equal to zero allowing AC power to be transmitted to the pair of welding poles 61 via the second transformer 68, otherwise the procedure is forwarded to step 920.

In step 919, the preprogrammed CPU 20 checks whether a heat compensation time period on the workpieces has been downcounted to zero. If the heat compensation time period has not been downcounted to zero, the step 919 is repeated, in the meantime the phase angles of the SCRs 66 and 67 are not equal to zero allowing AC power to be transmitted to the pair of welding poles 61 via the second transformer 68, otherwise the procedure is forwarded to step 917.

In step 917, the preprogrammed CPU 20 checks whether a predetermined timer therein has been downcounted to zero. If the timer has been downcounted to zero, the procedure is forwarded to step 920, otherwise to step 912.

In step 920, the preprogrammed CPU 20 checks whether a holding time period on the workpieces has been downcounted to zero. If the holding time period has not been downcounted to zero, the step 920 is repeated, otherwise the procedure is forwarded to step 921.

In step 921, the preprogrammed CPU 20 checks whether the alternating switch in each pair of SCRs has been, circulated. If positive, the procedure is forwarded to step 922, otherwise to step 906.

In step 922, the preprogrammed CPU 20 checks whether an open time period for the welding the workpieces has been downcounted to zero. If the open time period has not been downcounted to zero, the step 922 is repeated, otherwise the procedure is forwarded to step 923.

In step 923, the preprogrammed CPU 20 checks whether the alternating switch in different welding modules has been circulated. If positive, the procedure is forwarded to step 924, otherwise to step 906.

In step 924, the preprogrammed CPU 20 checks whether the workpiece is suitable to be retreated from the platform. If negative, the step 924 is repeated, otherwise the procedure is forwarded to step 925. In step 925, a signal for retreating, the workpiece from the platform is sent out and the procedure is forwarded to step 926.

In step 926, the preprogrammed CPU 20 checks whether additional welding work is required to apply on other locations of the workpiece. If positive, the procedure is forwarded to step 902, otherwise to step 927 to finish the welding work.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A multi-point spot welding controller comprising a central processing unit, a memory means, a monitoring interface means, a system bus, an input means, a first display means, a second display means, an output interface means, a switch output interface means, and a plurality of spot welding circuits;

said central processing unit together with said memory means constituting a central control means for controlling an operation of said spot welding controller;

said monitoring interface means being electrically connected to said central processing unit and allowed to be electrically connected to an external personal computer by which a user operates to monitor and control said spot welding controller;

said system bus being electrically connected between said central processing unit and said memory means for data communication therebetween;

said input means being electrically connected to said system bus for inputting a set of predetermined spot welding parameters;

said switch output interface means being electrically connected to said system bus for controlling said welding electrodes to move up or down, to respectively start or stop a welding operation;

said output interface means being electrically connected to said system bus for sending a plurality of welding signals;

said spot welding circuit being electrically connected to said output interface means for receiving said welding signals therefrom and responsive to drive or stop driving a pair of welding electrodes connected thereto;

said first display means and said second display means being electrically connected to said system bus for displaying conditions;

said multi-point spot welding controller further comprising:

a welding circuit comprising a plurality of substantially identical subcircuits;

means for positioning said workpieces in a welding platform;

means for activating a welding machine having a plurality of pairs of welding electrodes, each pair of said welding electrodes being connected to one of said subcircuits comprising a transformer and a pair of silicon-controlled rectifiers (SCPs);

means for checking whether said workpieces and said welding electrodes of said welding machine are positioned in respective predetermined relative positions;

means associated with said output interface means for sending welding signals to at least one sub circuit corresponding to a predetermined welding location;

means for preheating said workpieces for a predetermined period of time, said preheating being provided by setting the phase angles of said pair of silicon-controlled rectifiers associated with a selected pair of welding electrodes not equal to zero so as to allow an AC power to be transmitted to said welding electrodes via said transformer connected thereto;

means for first resting said electrodes by turning off said preheating for a predetermined period of time;

means for applying welding on said workpieces for a predetermined period of time, said welding being provided by setting the phase angles of said pair of silicon-controlled rectifiers not equal to zero so as to allow an AC power to be transmitted to said welding electrodes via said transformer;

means for second resting said electrodes by turning off said welding for a predetermined period of time;

means for applying heat compensation on said workpieces for a predetermined period of time, said heat compensation being provided by setting the phase angles of said pair of silicon-controlled rectifiers not equal to zero so as to allow an AC power to be transmitted to said welding electrodes via said transformer;

means for holding said workpieces, to which said heat compensation has been applied, for a predetermined period of time: and means associated with a pair of switches on said silicon controller rectifiers for sending said welding signals to other intended welding locations.

2. A multi-point spot welding controller according to claim 1 wherein said input means comprises means for changing said preheating time, said first resting time, said welding time, said second resting time, and said holding time during said welding operation.

* * * * *